United States Patent [19]
Sitkewich et al.

[11] 4,224,820
[45] Sep. 30, 1980

[54] FREQUENCY DEVIATION METER FOR TIMEPIECES

[76] Inventors: W. Jorge Sitkewich, Two Gwynne Rd., Franklin, Mass. 02038; Sanford Roth, 1 Stillwood La., Catskill, N.Y. 12414

[21] Appl. No.: 14,380
[22] Filed: Feb. 23, 1979
[51] Int. Cl.³ ............................................. G04B 17/00
[52] U.S. Cl. ........................................................ 73/6
[58] Field of Search ............................................ 73/6

[56] References Cited

U.S. PATENT DOCUMENTS

| 3,690,144 | 9/1972 | Bonny | 73/6 |
| 3,811,315 | 5/1974 | Kunitomi | 73/6 |
| 3,817,083 | 6/1974 | Jucker | 73/6 |
| 3,892,124 | 7/1975 | Reese | 73/6 |
| 3,946,592 | 3/1976 | Ichikawa | 73/6 |
| 4,024,750 | 5/1977 | Erickson | 73/6 |
| 4,083,222 | 4/1978 | Stawiski | 73/6 |

Primary Examiner—S. Clement Swisher
Attorney, Agent, or Firm—Shlesinger, Arkwright, Garvey & Dinsmore

[57] ABSTRACT

A frequency deviation meter provides a display of the error in a timepiece's internal oscillator, and includes a plurality of pickup devices among which are electrostatic and ultrasonic detectors. Frequency of the timepiece's oscillator and the frequency error is displayed as seconds lost or gained per month. An elongated aluminum alloy resonant column of tool stock material having a crystal pickup provides a sensitive vibration detector assembly.

18 Claims, 8 Drawing Figures

FREQUENCY DEVIATION METER FOR TIMEPIECES

BACKGROUND OF INVENTION

This invention relates to a device for detecting and indicating the deviation from a standard, of a timpiece's internal oscillator. It is particularly applicable for use by manufacturers and jewelers who need to determine whether or not a timepiece is operating too fast or too slow so that the timepiece can be properly calibrated. Although calibration instruments have been available before, either the accuracy of the instrument was so poor that it can only be used for rough checking or the expense of the instrument was beyond the means of all but the largest jewelers. This invention is aimed at providing a quality, and accurate calibration instrument which is within the means of the average jeweler. The sensitivity and the signal to noise ratio have been enhanced to a point that the devices are able to measure almost any watch available, and in some cases only contact with the watch bracelet is required.

Prior attempts have been made to develop such a device, typical of these attempts are: patents to Ichikana U.S. Pat. No. 3,946,592, Erickson U.S. Pat. No. 4,024,750, Reese U.S. Pat. No. 3,892,124, Jacker U.S. Pat. No. 3,817,083, Cunitomi U.S. Pat. No. 3,811,315, and Bonny U.S. Pat. No. 3,690,144. Some of these prior devices required cumbersome mechanical clamps or special grounding schemes that had to be applied to the timepiece in order to be measured. Other devices would measure only a particular type of electronic timepiece; such as LED types because of their strong electromagnetic radiation, or stepper motor types because of their detectable ticking sounds. An additional feature of this invention is the device capability of producing a readout in a very short period of time on the order of one second.

SUMMARY AND FEATURES OF INVENTION

A feature of the present invention is to provide a device to detect and indicate the deviation from the correct operating frequency of a timepiece's internal oscillator.

Another feature of the present invention is to provide a device to rapidly detect and indicate the deviation from the correct frequency of a timepiece's internal oscillator.

Another feature is the use of a plurality of detector devices which are automatically selected.

It is a still further feature of the present invention to provide a device that utilizes amplifier techniques which provide a high signal to noise ratio to enable the use of this device on timepieces which have very low signal levels.

Still another feature of the present invention is to provide a device to detect and indicate the operating frequency and the deviation from such correct frequency of a timepiece's internal oscillator.

A further feature is the use of a sensitive mechanical vibration detector assembly comprising a resonant column and mechanical pick-up for sensing mechanical vibrations emanating from the timepiece.

A further feature is the use of phase lock loop circuits to reduce the phase jitter and to provide good signal outputs for the digital circuits.

An additional feature of the present invention is to provide a device to detect and indicate the deviation from the correct frequency of a timepiece's internal oscillator by incorporating a dual pickup upon which the timepiece is set; this enables both ultrasonic and electrostatic reception of the timepiece's internal oscillator frequency.

Another feature of the present invention is to provide a device for detecting and indicating the deviation from the correct frequency of a timepiece's internal oscillator of 786 KHZ, which is accurate, of high quality and can be manufactured at a low cost.

DESCRIPTION OF THE INVENTION

Figure 1:
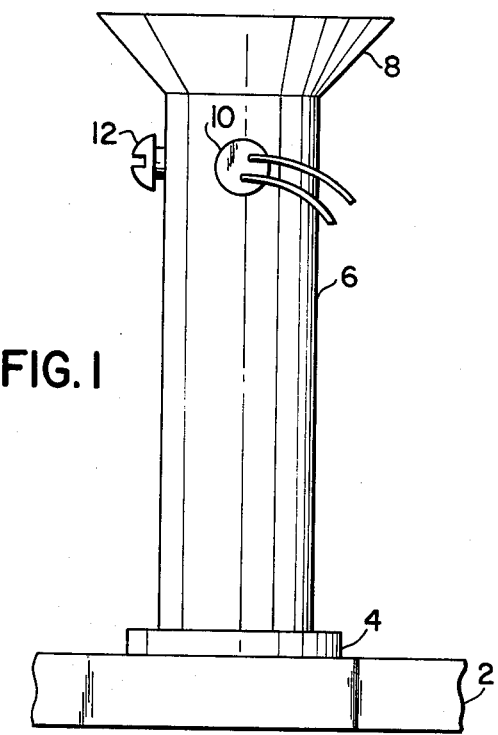
FIG. 1 shows the resonant column which supports the piezo-electric device.
Figure 2:
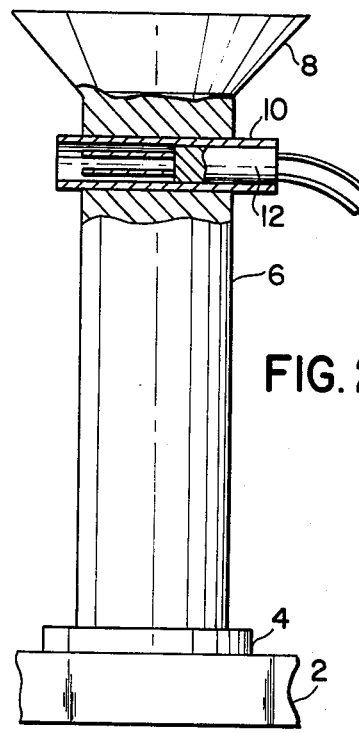
FIG. 2 is a side cross-sectional view of the resonant column with a piezo-electric device installed.

Referring to FIGS. 1 and 2, the resonant sensor column simply includes a base member 2 with a height adjusting pad 4 mounted thereon. A resonant column 6 is mounted on the height adjusting pad 4 and has a conical upper section 8. A piezo-electric detector 10 is mounted within a transverse passage at a point of maximum vibration convergence in the resonant column 6 by mounting screw 12. Detector 10 is a purchasable item and includes a tuning fork type crystal having two integral, spaced vibration elements which are oriented so that they are in a vertical plane.

Figure 3:
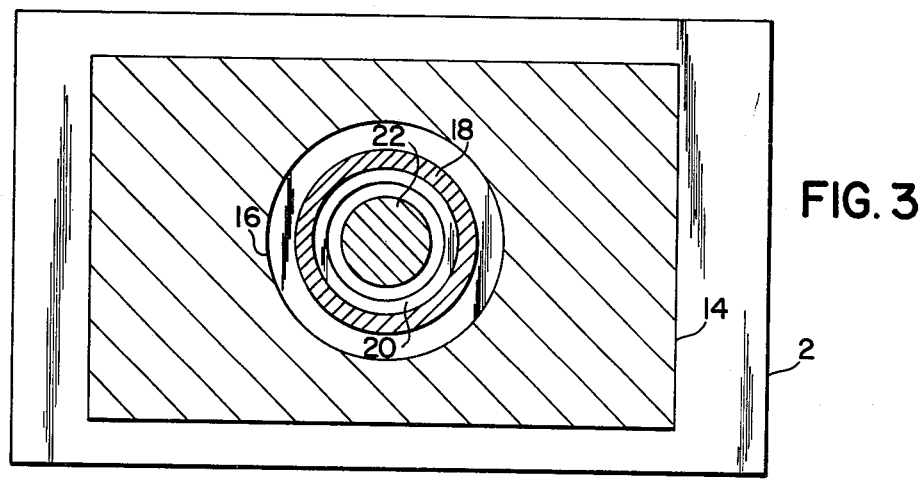
FIG. 3 is a top view of the resonant sensor column and the electrostatic detector in the preferred embodiment.
Figure 4:
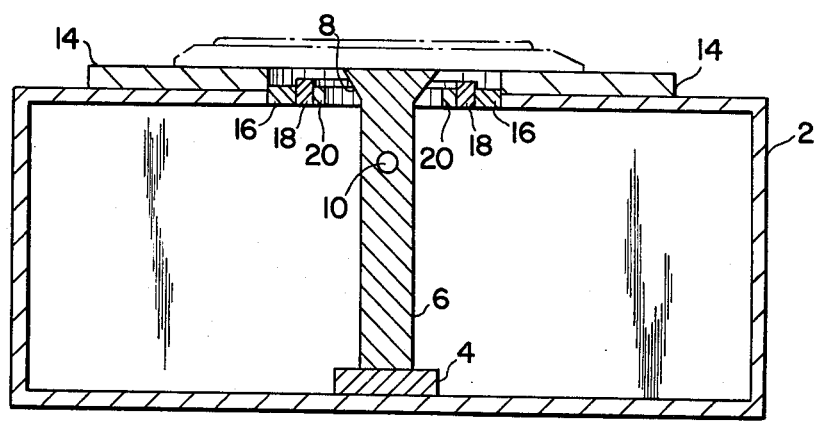
FIG. 4 is a cross-sectional view of the resonant sensor column and electrostatic detector in the preferred embodiment.

Referring now to FIGS. 3 and 4, the timepiece oscillator detector includes a generally rectangular block 2 with a conductive resilient surface 14 mounted thereon. The electrostatic detector includes an outer ring 16, a sensor insultor ring 18 and an inner conductive ring 20 of metal.

The resonant sensor column assembly of FIGS. 1 and 2 is positioned centrally within the housing and projects through ring 20 with its top surface 22 flush with the top of the resilient conductive covering. It is aluminum stock.

Figure 5:
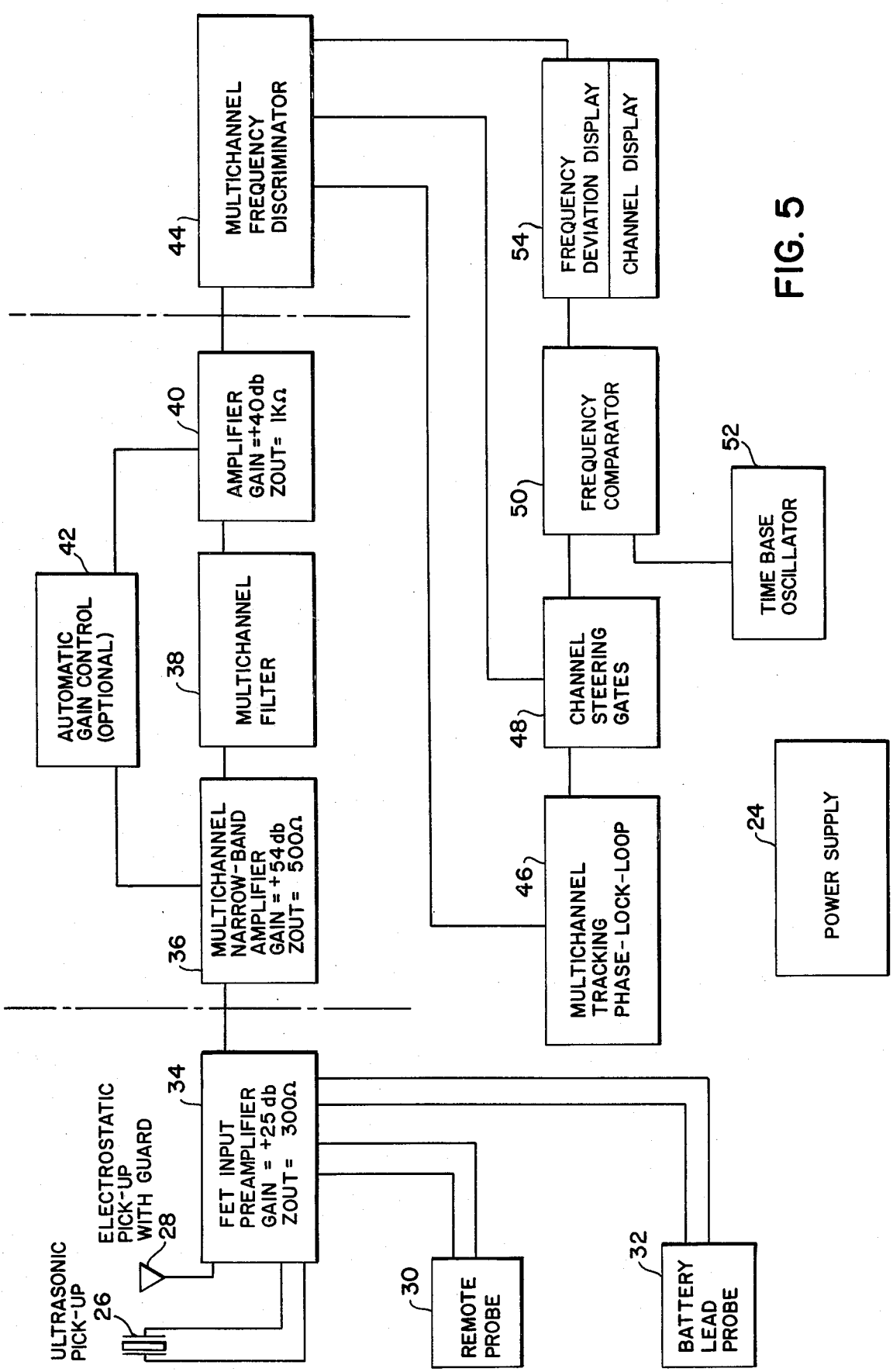
FIG. 5 is a block diagram of the frequency deviation meter in the preferred embodiment.

Referring to the electronic block diagram of FIG. 5, the frequency deviation meter includes a regulated power supply 24 which is of standard construction with two voltage outputs which are in turn connected to the inputs of the different circuitry. The voltage outputs are +9 volts and +12 volts respectively in the preferred embodiment.

The vibration (ultrasonic) and electrostatic detectors 26 and 28 are connected to the inut of the field effect preamplifier section 34. An optional remote detector 30 includes an ultrasonic and electrostatic detector which can be connected to the input of the field effect preamplifier section 34. This section 34 receives the outputs from the ultrasonic and electrostatic detectors 26 and 28 and provides a signal to an input of the multichannel narrowband amplifier 36, the output of which is connected to the multichannel filter 38. The output of the multichannel filter is supplied to amplifier 40.

Automatic gain control 42 is connected to the multichannel narrowband amplifier 36 and to amplifier 40. The input to the frequency discriminator 44 is connected to the output of the amplifier 40. The first output of the frequency discriminator 44 is connected to the multichannel tracking phase lock loop 46, the second to the channel steering gate circuit 48 and the third to the frequency deviation display 42.

The multichannel tracking phase lock loops 46 are connected so as to track input signals from the multifrequency discriminator, and supply outputs to the channel steering gate circuit 48. The gate circuit 48 is controlled by the output from the multichannel frequency discriminator 44 and serves to steer one of the outputs from the multichannel tracking phase lock loops to the input of the frequency comparator 50.

Frequency comparator 50 has two inputs, one of which is supplied by the channel steering gate circuit 48, and the other of which is supplied from the timepiece oscillator 52. The output from the frequency comparator drives the frequency deviation display 54. The timebase oscillator 52 is of standard construction and oscillates at 2.6298 MHZ; it serves as the reference for the deviation meter.

The frequency deviation display 54 is connected to the output of the frequency comparator and to one of the inputs of the multichannel frequency discriminator 44. This display has two outputs, one of which is controlled by the frequency comparator 50, the other of which is controlled by the output from the multichannel frequency discriminator 44.

Figure 6:
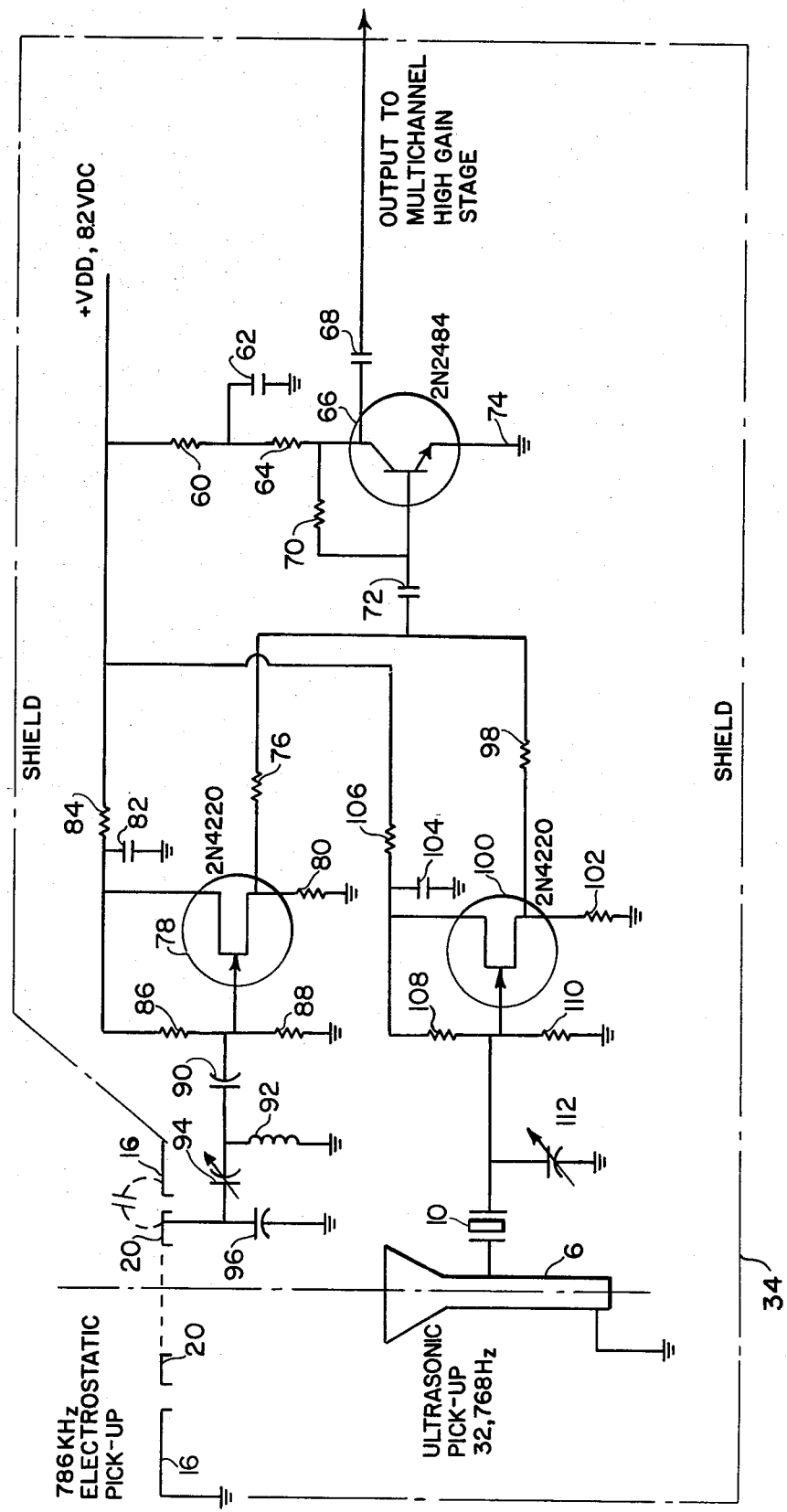
FIG. 6 is a schematic diagram of the input preamplifier.

Referring now to FIG. 6, the low noise front-end amplifier includes two field effect transistor preamplifier circuits whose outputs are combined and are connected to the input of an amplifier circuit. The amplifier circuit output is connected to the input of the multichannel narrowband amplifier 36.

The power supply's positive output is connected to the junction of resistors 60, 106 and 84. One lead of resistors 60 is connected to the junction of resistors 106 and 84 and the other lead is connected to the junction of capacitor 62 and resistor 64. Capacitor 62 has one lead connected to the junction of resistors 60 and 64 and the other lead is connected to electrical ground.

One of the leads from resistor 64 is connected to the junction of resistor 60 and capacitor 62 and the other lead is connected to the junction of resistor 70, capacitor 68 and the collector lead of transistor 66.

Capacitor 68 has one lead connected to the junction of resistors 64 and 70 and the collector lead of transistor 60. The other lead of capacitor 68 is connected to the input of multichannel narrowband amplifier 36.

The emitter lead 74 of transistor 66 is connected to electrical ground. Feedback resistor 70 is connected between the junction of resistor 64, output capacitor 68 and the collector lead of transistor 66 while the other lead is connected to the junction of input capacitor 72 and the base lead of transistor 66.

The input capacitor 72 has one lead connected to the junction of resistor 70 and the base lead of transistor 66 while the lead is connected to the junction of output resistors 76 and 98. Output resistor 76 has one lead connected to the junction of resistor 98 and input capacitor 72 and the other lead connected to the junction of resistor 80 and the drain lead of field effect transistor 78.

Resistor 80 has one lead connected to the electrical ground and the other lead connected to the junction of output resistor 76 and the drain lead of the field effect transistor 78. Bypass capacitor 82 has one lead connected to electrical ground and the other lead connected to the junction of the source lead of the field effect transistor 78, resistor 87 and resistor 86.

Resistor 87 has one lead connected to the junction of capacitor 82 and resistor 86 and the other lead is connected to the junction of resistors 106 and 60. Input biasing resistor 86 has one lead connected to the junction of capacitor 82, resistor 84 and the source lead of field effect transistor 78 and other lead connected to the junction of capacitor 90, resistor 88 and the base lead of field effect transistor 78.

Resistor 88 has one lead connected to electrical ground and the other lead connected to the junction of the base lead of field effect transistor 78, capacitor 90 and resistor 86. Input capacitor 90 has one lead connected to the junction of resistors 86, 88, the base lead of field effect transistor 78 and the other lead is connected to the junction of capacitor 94 and inductor 92.

The input matching circuit for the first preamplifier includes inductor 92 which has one lead connected to electrical ground and the other lead connected to the junction of capacitors 94 and 90. Capacitor 94 which has one lead connected to the junction of inductor 92 and capacitor 90 while the other lead is connected to the junction of capacitor 90 while the other lead is connected to the junction of capacitor 96 and the inner conducting ring of the electrostatic detector 20.

Capacitor 96 has one lead connected to electrical ground and the other lead connected to the junction of capacitor 94 and the inner conducting ring of the electrostatic detector 20.

The output resistor for the second preamplifier 98 has one lead connected to the junction of resistor 76 and capacitor 72 while the other lead is connected to the junction of the drain lead of field effect transistor 100 and resistor 102. Resistor 102 has one lead connected to ground and the other lead connected to the junction of the drain lead of field effect transistor 100 and to resistor 98.

Bypass capacitor 104 has one lead connected to ground and the other lead connected to the junction of source lead of field effect transistor 100, resistor 106 and resistor 108. Resistor 106 has one lead connected to the junction of resistors 84 and 60 while the other lead is connected to the junction of the source lead of field effect transistor 100 and resistor 108.

Input biasing resistor 108 has one lead connected to the junction of the base lead of field transistor 100, resistor 110, capacitor 112 and the piezo-electric pickup 10. The other lead is connected to the junction of capacitor 104, resistor 106 and the source lead of the field effect transistor 100. Resistor 100 has one lead connected to ground and the other lead connected to the base lead of field effect transistor 100, resistor 108, capacitor 112 and the piezo-electric detector 10.

Input matching capacitor 112 has one lead connected to electrical ground and the other lead connected to the junction of resistor 108, resistor 110, the base lead of field effect transistor 100 and the piezo-electric detector 10.

Figure 7:
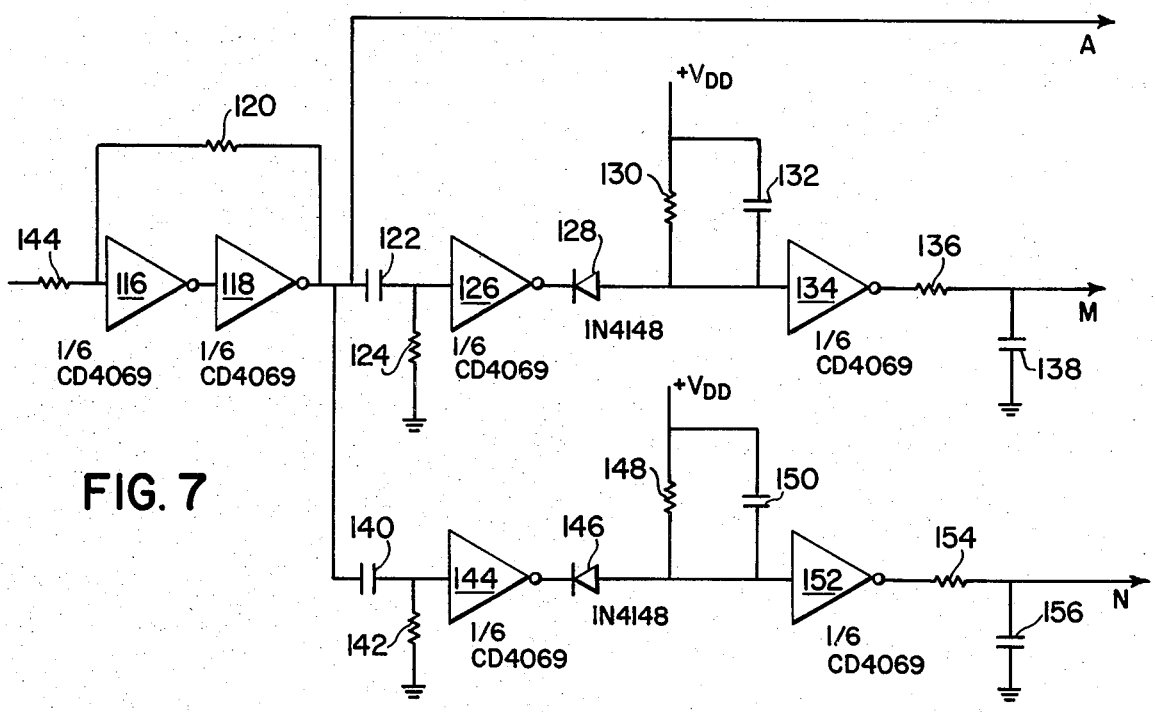
FIG. 7 is a schematic diagram of the multichannel frequency discriminator.

Referring now to FIG. 7, the multi-frequency detector includes an input amplifier comprised of resistor 114 which has one lead connected to the output of the multichannel filter while the other lead is connected to the junction of the input to inverter 116 and resistor 120. The output lead from inverter 116 is connected to the input lead of inverter 118 while the input lead of opamp 116 is connected to the junction of resistors 120 and 114.

The input inverter 118 is connected to the output of inverter 116 while the output inverter 116 is connected to the junction of capacitors 122, 140 and resistor 120. Feedback resistor 120 has one lead connected to the junction of the input resistor 114 and the input lead to inverter 116 while the other lead is connected to the junction of the output lead from inverter 118 and capacitors 140 and 122.

Two frequency detectors, the first of which is comprised of input capacitor 122 which has one lead connected to the junction of the output lead of inverter 118, resistor 120 and capacitor 40 and the output lead of the multichannel tracking phase lock loops while the other lead is connected to the junction of R124 and inverter 126. Resistor 124 has one lead connected to ground and the other lead connected to the junction of capacitor 122 and inverter 126.

The input lead to inverter 126 is connected to the junction of input capacitor 122 and resistor 124 while the output is connected to the anode of diode 128. The cathode lead from diode 128 is connected to the junctions of resistor 130, capacitor 132 and the input lead to inverter 134 while the other lead is connected to the output of inverter 126.

Resistor 130 has one lead connected to the junctions of diode 128, capacitor 132 and the input lead to inverter 134 while the other lead is connected to the positive power supply terminal. Capacitor 132 has one lead connected to the junctions of diode 128, resistor 130 and inverter 134, while the other lead is connected to the positive power supply terminal.

The input lead to inverter 134 is connected to the junctions of C132, R130, and diode 128 while the output is connected to the output resistor 136. Output resistor 136 has one lead connected to the output of inverter 134 while the other lead is connected to the junction of 138 and one of the outputs to the control gates.

The second frequency detector is comprised of input capacitor 140 which has one lead connected to the junction of inverter 118, resistor 120 and capacitor 122, and the other lead connected to the junction of resistor 142 and inverter 144. Resistor 142 has one lead connected to ground and the other lead connected to the junction of capacitor 140 and inverter 144.

Inverter 144 has an input lead connected to the junction of input capacitor 140 and resistor 142 and the output connected to the anode of diode 146. The cathode of diode 146 is connected to the junction of resistor 148, capacitor 150 and the input lead to inverter 152, while the anode lead is connected to the output of inverter 144.

Resistor 148 has one lead connected to the positive voltage terminal of the power supply and the other lead connected to the junction of diode 146, capacitor 150 and the input lead to inverter 152. Capacitor 150 has one lead connected to the junction of diode 146, resistor 148 and the input lead to inverter 152 while the other lead is connected to the positive DC terminal of the power supply.

The output lead from inverter 152 is connected to resistor 154 while the input lead is connected to the junctions capacitor 150, resistor 148 and diode 146. Output resistor 154 has one lead connected to the output of inverter 152 while the other lead is connected to the junction capacitor 156 and one of two leads going to the control gates. The capacitor 156 is connected to the junction of resistor 154 and the output lead to the control gates, and electrical ground.

Figure 8:
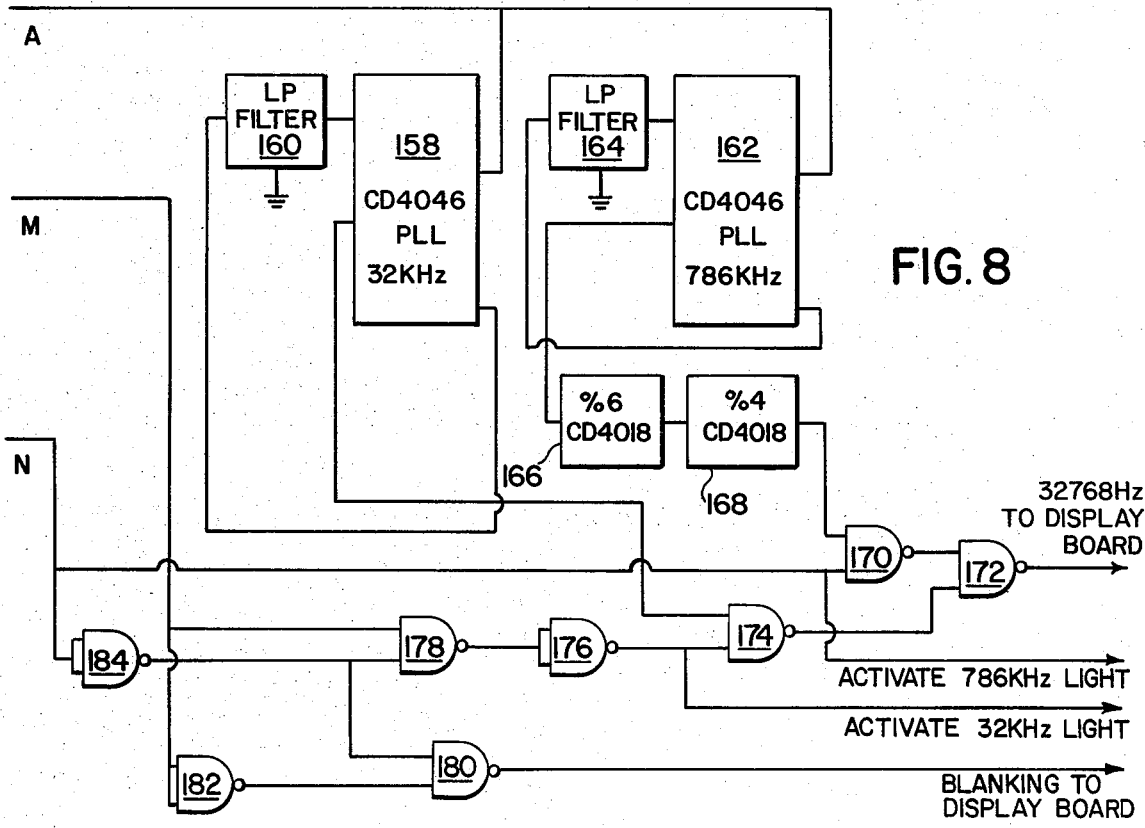
FIG. 8 is a schematic diagram of the multichannel tracking phase lock loops and the channel steering gates.

Referring now to FIG. 8, the phase lock loops and control gates include a first tracking phase lock loop comprised of a CMOS phase lock loop 158 and the low pass filter 160. The second phase lock loop circuit comprised of CMOS phase lock loop 162 and low pass filter 164. These phase lock loops are comprised of standard components and integrated circuits. The second phase lock loop arrangement is connected to a divide by 24 arrangement comprised of presettable divide-by-N counters 166 and 168.

The output of divider 168 is connected to one of the inputs of the nand gate 170. The other input of nand gate 170 is connected to the junction of input leads of inverter 184 and the input line from the frequency detectors at the junction of capacitor 156 and resistor 154. The output from the nand gate 170 is connected to the first of two inputs of nand gate 172.

The second input from nand gate 172 is connected to the output of nand gate 174 while the output from nand gate 172 is connected to the display board. One of the two inputs from nand gate 174 is connected to the output from phase lock loop 158 while the other lead is connected to the output of inverter 176. The input leads to inverters 176 are connected to the output lead of nand gate 178.

One of the two inputs of nand gate 178 is connected to the junction of inverter 182 and to the first frequency detector at the junction of resistor 136 and capacitor 138. The other input is connected to the junction nand gate 180 and the output from inverter 184. Nand gate 180 has one input lead connected to the junction of nand gate 178 and inverter 184 and the other input lead connected to the output of inverter 182. The output from nand gate 180 is connected to the display board.

The input leads of nand gate 182 are connected to the junction of nand gate 178 and to the first frequency detector at the junction of capacitor 138 and resistor 136. Inverter 184 has an output connected to the junctions of nand gates 180 and 178. The input leads to inverter 178 are connected to the junction of nand gate 170 and the second frequency detector at the junction resistor 154 and capacitor 156.

OPERATION

Referring now to FIG. 1, the operation of the resonant sensor column is as follows:

Resonant column 6 has an inverted conical end 8 which serves to contact the casing of the timepiece being monitored. The inverted conical shape 8 focuses the received ultrasonic waves down the resonant column 6. The detector 10 will detect the ultrasonic waves traveling within the resonant column 6. Screw 12 serves to prevent movement the piezo-electric detector 10 within the resonant column 6. The torque to which the screw is tightened is adjusted for maximum sensitivity of the piezo-electric detector 10. The resonant column 6 is mounted on a height adjustment pad 4, this pad 4 serving to adjust the height of resonant column 6 so that the contacting surface on the top of the inverted conical shape will be at a preset height.

Referring now to FIG. 2, the piezo-electric device 10 includes a resonant crystal 12. This resonant crystal 12 is of tuning fork type construction and has a design frequency of 32,768 Hz. The forks of the crystal are lined vertically with respect to the center axis of the resonant column 6. This enables the detector 10 to have a maximum sensitivity as the crystal 12 is oriented approximately the same as that of a crystal element within the watch-piece to be measured. The ultrasonic detector 10 is mounted within the resonant column 6 at a point which is one-quarter of a wavelength (of 32,768 Hz) up from the fixed end which is attached to the height adjusting pad 4. Although only one mounting hole is shown, it will be appreciated that the mounting location will be changed so that the detector is always at a point which is one-quarter of a wavelength (of 32,768 Hz) up the resonant column 6 from the fixed end on the height adjusting pad 4 for ech frequency to be detected.

The purpose of the resonant column is to provide an amplification of the mechanical frequencies imparted thereto through its upper surface from the timepiece which mechanically has a vibrating frequency of 786 KHz. The length of the column is depended upon the frequency selected for resonance, which in this instance in the twenty-fourth harmonic of the 786 KHZ frequency of the timepiece.

Referring now to FIGS. 3 and 4, the preferred arrangement for the multifrequency detector is as follows:

The resonant sensor column upper surface 22 is completely surrounded by the inner conducting ring of the electrostatic pickup 20. The spacig between the outside of the resonant sensor column 22 and the inside of the electrostatic pickup ring 20 is such as to enable free movement of the resonant sensor column 22 but of such a degree as to keep out large contaminants which may fall therebetween. The outer circumference of the electrostatic pickup ring 22 is surrounded by electrically insulating ring 18. This ring serves to isolate the inner electrostatic ring 20 from the outer electrostatic ring 16.

The outer electrostatic ring 16 surrounds the entire outside perimeter of the insulating ring 18 and is affixed around the entire inside circumference of the opening in housing 2.

The housing 2 has a commercially available conductive resilient covering 14 mounted thereon. It is made of rubber with metallic particles. This covering has a low durometer rating and serves to both electrically ground the watchpiece mounted thereon and also to prevent abrasion of the watch casing surface. Housing 2 is of metallic construction so as to shield the resonant sensor column 22 and the electrostatic detector from stray fields not associated with the timepiece being measured.

The construction of the detector is such that when a timepiece is placed on top the resilient pad covering 14 and over and in contact with the resonant sensor column upper surface 22, the ultrasonic signals from the watch will be picked up and transmitted along the resonant sensor column 6. In addition, the fields generated by the oscillator within the timepiece will be detected by the electrostatic detector.

FIG. 5 shows the preferred arrangement for the timepiece deviation meter.

Ultrasonic detector 26 and electrostatic detectors 28 are connected to the input of preamplifier circuit 34. The ultrasonic detector 26 picks up vibrations while in contact with the watch casing, and the electrostatic detector 28 detects fields generated by the oscillator within the monitored watchpiece.

The field effect transistor preamplifier circuit 34 serves to amplify the input signals from the ultrasonic and electrostatic detectors, and consists of two field effect transistor preamplifier stages. The output from the preamplifier stages are combined and amplified by an additional amplification stage. The gain for the total system is approximately twenty-five db.

Remote probe 30 is a combination ultrasonic and electrostatic detection unit. These can be used in place of the fixed ultrasonic and electrostatic detectors 26 and 28.

Battery lead probe 32 is an optional detection system which can monitor the timepiece oscillator without requiring a timepiece battery.

The multichannel narrowband amplifier 36 consists of a wideband amplifier which is tuned to amplify either 786 KHZ or 32.768 KHZ signals. This amplifier exhibits a gain of approximately 54 db to either of the two signals.

The multichannel filter 38 consists of dual crystal filters, constructed in parallel. These filters will pass signals from the electrostatic and ultrasonic (resonant column) assemblies, respectively which are approximately 786 KHZ or 32.6 KHZ and will reject the signals of other frequencies.

Amplifier 40 consists of three amplification stages, the first of which is a field effect transistor (FET) input stage which matches the high output impedance from the crystal filter. The remaining two stages of the amplifier further amplify the output signals from the FET amplifier. The automatic gain control 42 is an optional arrangement which connects to both amplifiers 40 and 36 to control the gain to provide a constant amplitude output signal from amplifier 40.

The multichannel frequency discriminator 44 includes two detectors which will detect which of the two signals 786 KHZ or 32.768 KHZ is present in the output signal from amplifier 40. They work on the basis of a retriggerable monostable multivibrator. The output from these detectors controls the steering gates 48. The input to the multichannel frequency discriminator also connects to the frequency deviation display 54 and to the multichannel tracking phase lock loops 46. The multichannel phase lock loops 46 consist of two CMOS integrated circuit phase lock loops, one of which is tuned to track an input signal of approximately 786 KHZ and the other is to track an input signal of approximately 32.768 KHZ. The output from the phase lock loop that tracks the 786 KHZ signal is divided by twenty-four to produce a signal of approximately 32.768 KHZ. The two outputs from the phase lock loops go to the inputs of the channel steering gates 48.

Channel steering gates 48 serve the gate to two outputs from the phase lock loops 48 to enable only one of the outputs to proceed to the frequency comparator 50. The channel steering gates are controlled by the multichannel frequency discriminator 44.

Frequency comparator 50 compares the output from the channel steering gates to that of the time base oscillator 52. The output from the frequency discriminator is the difference between the signal received from the channel steering gates and that received from the time base oscillator.

Time base oscillator 52 is of standard construction and oscillates at 2.6298 MHZ.

The frequency deviation display 54 digitally displays the output from the frequency comparator 50 as seconds gained or lost by the timepiece in the period of a month with a minimal range of ±140 seconds per month. A second display displays the output signal from the multichannel frequency discriminator 44 which shows the actual operating frequency of the oscillator within the timepiece being monitored.

Referring now to FIG. 6, the FET input preamplifier circuit of FIG. 5 is shown. The final amplification transistor 66 is arranged in a common emitter configuration and serves to combine and further amplify the output signal from FET transistors 78 and 100, and providing a low impedance output.

The first FET preamplifier transistor 78 serves to amplify the input signal from the electrostatic detector rings 20 and 16.

The input impedance matching network consists of capacitors 96, 94 and 90 and inductor 92. The output signal from FET transistor 78 goes through resistor 76 where it is combined at the input to transistor 66.

The second FET preamplifier transistor 100 serves to amplify the detector signal from the ultrasonic detector 10. Capacitor 12 serves to adjust the input impedance to maximize the signal transfer from the ultrasonic detector 10 to the input of the FET transistor 100. The output from the second FET transistor 100 is fed through resistor 98 to the input of transistor 66.

The multichannel frequency discriminator is shown in FIG. 7. Resistors 144 and 120 and inverter stages 116 and 118 are configured to provide a comparator with hysteresis, also called a Schmitt trigger circuit. Resistor 120 serves as the feedback between the output inverter stage 116 and the input to inverter stage 116.

The input to the first frequency detector network is through input capacitor 122. Inverter stages 126 and 134 form a retriggerable monostable multivibrator adjusted to the frequency of 32 or 786 KHZ. The second frequency detector network has the input signal fed through input capacitor 140. Inverter stages 144 and 152 respond to a frequency of approximately 786 KHZ.

The output M goes high when a frequency of 32 KHZ or 786 KHZ is fed through the input capacitor 122. Output N goes high when the second frequency detector network detects a frequency of 786 KHZ fed through input capacitor 140. These outputs serve to control the steering gates so as to automatically select which of the two frequency channels will be utilized.

The input amplifier stages 116 and 118 also serve to shape the input signal into that of approximately a square wave. This aids the detectors as they respond to square waves much more readily than other wave forms.

Referring now to FIG. 8, the operation of the tracking phase lock loops and steering gates is a follows:

Signal A is passed through two phase lock loops 158 and 162 which are adjusted for a very narrow capture range. Phase lock loop 158 center frequency is adjusted to 32.748 KHZ while phase lock loop 162 center frequency is adjusted to 786.000 KHZ. The CMOS phase lock loop chip CD4046 has two phase comparators internal to the integrated circuit. By using the second phase comparator, filtering of the phase jitter of the incoming signal A is achieved. The output signal from phase lock loop 162 is divided by 24 so that the resultant output is approximately 32.768 KHZ.

The steering gates consist of the remaining circuitry and serve a logic control function. These gates read the status of lines M and N and decide which phase lock loop 158 or 162 will be steered through the output of gate 172 to the display board. The remaining signals serve as additional indicators and as control inputs to the display board.

While this invention has been described, it will be understood that it is capable of further modification, uses and/or adaptations of the invention following in general the principle of the invention and including such departures from the present disclosure as come within known or customary practice in the art to which the invention pertains, and as may be applied to the essential features hereinbefore set forth, as fall within the scope of the invention or the limits of the appended claims.

What we claim is:

1. A frequency deviation meter for determining the error of a timepiece internal oscillator comprising:
   (a) resonant sensor column means for picking up ultrasonic radiation from a timepiece internal oscillator,
   (b) an amplifier circuit connected to the output of said resonant column for amplifying the signal detected by the resonant column,
   (c) a reference oscillator connected in circuit with the amplifier,
   (d) a frequency comparator connected in circuit with the oscillator and amplifier circuit, for comparing the frequency of the reference oscillator to that of the output amplifier, and
   (e) display means connected to the output of said frequency comparator for indicating the output of said frequency comparator.

2. The frequency deviation meter for determining the error of a timepiece internal oscillator as set forth in claim 1, wherein:
   (a) the display means also indicates the frequency of the output signal from said amplifier.

3. The frequency deviation meter for determining the error of a timepiece internal oscillator as set forth in claim 1, wherein:
   (a) an electrostatic detector is also provided for detecting the internal oscillator of the timepiece, the output of which is connected to the amplifier.

4. An ultrasonic detector for a frequency deviation meter which measures vibrations, comprising:
   (a) a resonant column of material of good vibration transmitting characteristics having firmly supported fixed end with a constant surface which engages a member from which vibration emanates,
   (b) a vibration detector device positioned on said resonant column within an area of vibration convergence transmitted from said surface.

5. The ultrasonic detector as set forth in claim 4, wherein:
   (a) said resonant column having an end being rigidly affixed to a mounting means, and
   (b) said vibration detector device position at a point which is approximately one-quarter wave length of the frequency under test toward said contact surface from said fixed end.

6. The ultrasonic detector as set forth in claim 5, wherein:
   (a) said resonant column is terminated in an inverted conical shape, the base of which is said contact surface.

7. The ultrasonic detector as set forth in claim 5, wherein:

(a) the vibration detector device on said resonant column is a piezo-electric device.

8. The ultrasonic detector as set forth in claim 5, wherein:
   (a) the piezo-electric device has a tuning fork configuration and the arms are disposed in a line parallel to the center line of the resonant column.

9. A timepiece oscillator detector, comprising:
   (a) a housing having an upper generally flat surface having a conductive resilient covering thereon,
   (b) the surface and the covering having aligned central openings therethrough,
   (c) an electrostatic detector disposed adjacent the periphery of the openings,
   (d) a resonant sensor column protruding through the opening in said surface member, and
   (e) the resonant sensor column having a contact surface which is in substantially the same plane as the upper surface of said conductive resilient covering.

10. A frequency deviation meter for determining the error of a timepiece internal oscillator, comprising:
    (a) a detector means with plural output channels for detecting the frequency of a timepiece oscillator,
    (b) an amplifier connected to the outputs of said detector means for amplifying the output channels from said detector means,
    (c) a multichannel selecting means associated with said amplifier for selecting the desired frequency signals from said amplifier and feeding the resultant output signal to a frequency comparator,
    (d) a reference oscillator,
    (e) a frequency comparator associated with the reference oscillator and multichannel selecting means for comparing the frequency of the reference oscillator to that of the resultant output of said selecting means, and
    (f) display means connected to the output of said frequency comparator to indicate the output from said frequency comparator.

11. The frequency deviation meter as set forth in claim 10, wherein:
    (a) the detector means includes both an electrostatic detector and a vibration detector.

12. The frequency deviation meter as set forth in claim 11, wherein:
    (a) the electrostatic detector consists of a resiliently supported circular ring assembly which surrounds the pickup surface of the vibration detector.

13. The frequency deviation meter as set forth in claim 10, wherein:
    (a) the amplifier circuit includes a multichannel, narrowband amplifier, and
    (b) a multichannel filter connected to the output of said narrowband amplifier.

14. The frequency deviation meter set forth in claim 10, wherein:
    (a) said multichannel selecting means includes a phase lock loop circuit.

15. The frequency deviation meter as set forth in claim 14, wherein:
    (a) said frequency comparator includes two frequency responsive networks which provide unique outputs upon reception of either a first or a second pre-selected frequency.

16. The frequency deviation meter as set forth in claim 14, wherein:
    (a) said phase lock loop circuits are tuned to free run at a pre-selected frequency and lock to the incoming signals to filter phase jitter.

17. The frequency deviation meter as set forth in claim 10, wherein said display means includes:
    (a) display means for indicating the output signal from said frequency comparator, and
    (b) display means for indicating the actual frequency of the timepiece internal oscillator.

18. The frequency deviation meter as set forth in claim 10, wherein:
    (a) said display means indicates the output signal from said frequency comparator as the seconds gained or lost by the timepiece in a months time.

* * * * *